United States Patent [19]

Kuga

[11] Patent Number: 5,670,980

[45] Date of Patent: Sep. 23, 1997

[54] OUTPUTTER

[75] Inventor: Kaeko Kuga, Kyoto, Japan

[73] Assignee: Rohm Co., Ltd., Kyoto, Japan

[21] Appl. No.: 382,263

[22] Filed: Feb. 1, 1995

[30] Foreign Application Priority Data

Feb. 2, 1994 [JP] Japan ........................... 6-010750

[51] Int. Cl.$^6$ .......................... G09G 3/36; G02F 1/1335
[52] U.S. Cl. ..................... 345/102; 345/905; 349/69; 349/149; 313/509
[58] Field of Search .......................... 345/84, 87, 102, 345/76, 77, 98, 99, 100, 904, 905; 359/48, 49, 82, 87; 349/61, 69, 149, 150, 151, 152; 362/29; 313/505, 509; 428/917; 257/778

[56] References Cited

U.S. PATENT DOCUMENTS 4,257,041  3/1981  Masucci ........................... 345/84
5,432,015  7/1995  Wu et al. ........................... 313/509

FOREIGN PATENT DOCUMENTS 2137394  10/1984  United Kingdom .

Primary Examiner—Steven Saras
Attorney, Agent, or Firm—Nikaido Marmelstein Murray & Oram LLP

[57] ABSTRACT

A compact outputter of a simple structure is provided without the back lighting function being deteriorated. A transparent electrode is exposed out of a first surface and a second surface through a through hole of an electro luminescence element. A driving signal output by an LSI chip is directed from a driving signal outputting aluminum electrode to a driving signal inputting transparent electrode through another transparent electrode. The driving signal is input to an LCD panel. Since the LSI chip is mounted on the second surface, the light from the electro luminescence element illuminating the LCD panel is not intercepted.

4 Claims, 2 Drawing Sheets

OUTPUTTER

BACKGROUND OF THE INVENTION

1. Field of the Invention

The present invention relates to an outputter, and more specifically, to an outputter such as a liquid crystal display (LCD) and a printer head for use in a multimedia apparatus, a game apparatus, a portable electronic calculator, a television receiver, a simulator, a personal computer and a workstation.

2. Description of the Prior Art

In an outputter such as an LCD which outputs non-light-emitting image information, it is necessary to illuminate the LCD to display a visible image. For this reason, for example in a transmission-type LCD, the back surface of the LCD panel which provides a display is uniformly illuminated by a back light including an illuminating element and a light diffusing member. When a point light source such as an incandescent lamp or a line light source such as a fluorescent lamp is used as the illuminating element, the above-mentioned light diffusing member is necessary to use the point or the line light source as a surface light source by diffusing the light from the illuminating element. However, when an electro luminescence (EL) element which is a surface light source is used, the light diffusing element is unnecessary.

For the LCD, a large scale integrated circuit (LSI) chip is necessary to drive the LCD panel. FIG. 1 shows an LSI chip 3 connected to an LCD panel 1 by a TAB film 11. As shown in this figure, in a conventional LCD, the LSI chip 3 is arranged on a side of the LCD panel 1. Besides the tape automated bonding (TAB), a wire bonding and a solder bonding are known as methods to connect the LSI chip 3 and the LCD panel 1.

In the arrangement where the LSI chip 1 is provided on a side of the LCD panel 1 as described above, the size of the outputter increases and the arrangement of the outputter is complicated because of the TAB film and wires used for the bonding.

This problem can be avoided by arranging the LSI chip 3 at a back side of the LCD panel 1 as shown in FIG. 2 since the LSI chip 3 is far thinner than the LCD panel 1. However, since the LSI chip 3 intercepts a light L when the back surface of the LCD panel 1 is illuminated, it is impossible to uniformly illuminate the entire surface of the LCD panel 1.

SUMMARY OF THE INVENTION

An object of the present invention is to provide a compact outputter of a simple structure without the back lighting function being deteriorated.

To achieve the above-mentioned object, according to the present invention, in an outputter provided with an output panel which outputs image information by transmission and interception of light, a driving circuit which outputs a driving signal to the output panel, and a back light which illuminates the output panel, a through hole is formed in the back light to pass therethrough from a light emitting surface to a back surface thereof, and a transparent electrode is formed to be exposed out of the light emitting surface and the back surface through the through hole. The output panel is arranged on the side of the light emitting surface. The driving circuit is arranged on the side of the back surface. The input electrode of the output panel and the output electrode of the driving circuit are connected through the transparent electrode.

In the above arrangement, a driving signal from the driving circuit is supplied to the output panel through the transparent electrode provided at the through hole, so that the light from the back light illuminating the output panel is not intercepted by the driving circuit.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
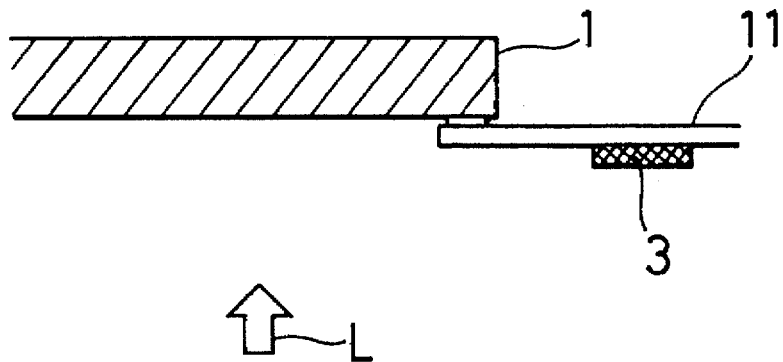
FIG. 1 is a cross-sectional view of a conventional LCD.
Figure 2:
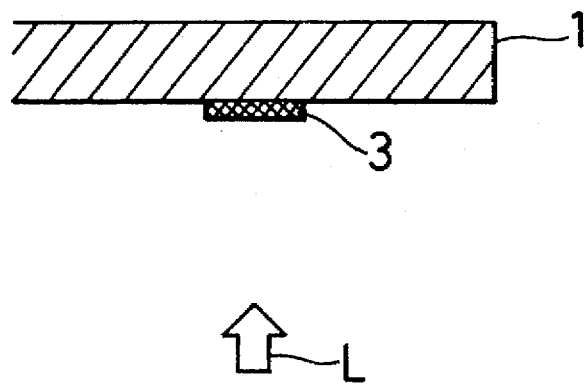
FIG. 2 is a cross-sectional view of another conventional LCD.
Figure 3:
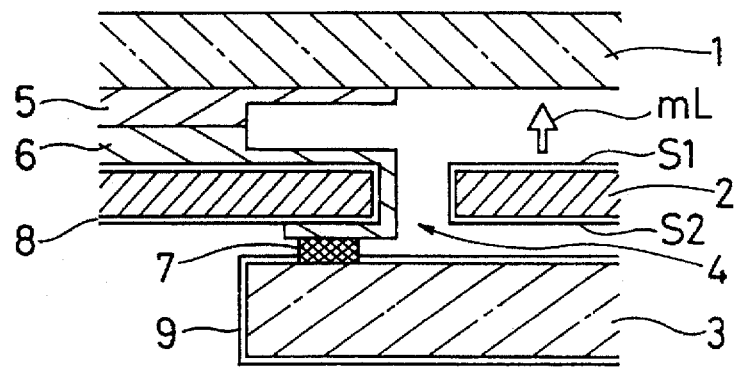
FIG. 3 is a cross-sectional view of a relevant portion of an LCD embodying the present invention.
Figure 4:
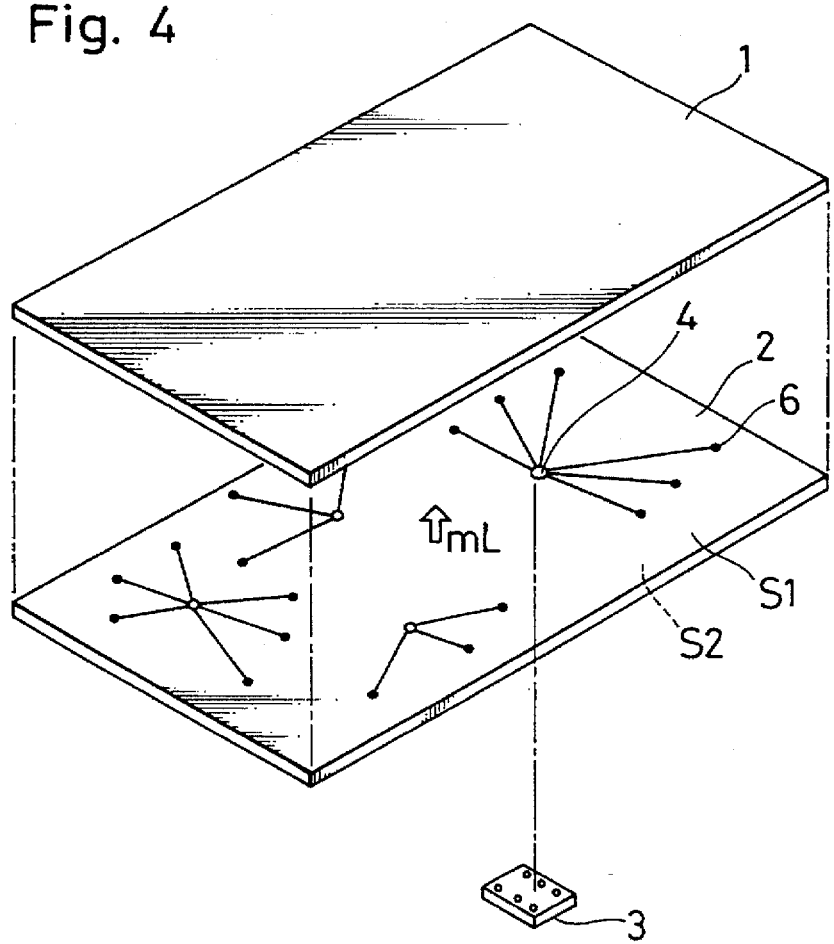
FIG. 4 is an exploded perspective view of an assembly structure of the LCD embodying the present invention.

An example will be described where the present invention is employed in a transmission-type LCD. The cross-sectional structure of a relevant portion of the LCD is shown in FIG. 3. The assembly structure thereof is shown in FIG. 4. The same elements and portions as those of the conventional outputters shown in FIGS. 1 and 2 are identified by the same reference designations.

As shown in FIGS. 3 and 4, the LCD of the present invention includes an LCD panel 1 which outputs image information by transmission and interception of light, an LSI chip 3 which outputs a driving signal to the LCD panel, and an EL element 2 which illuminates the LCD panel 1.

The EL element 2 has a through hole 4 formed to pass through a first surface S1 which emits light in the direction of arrow mL of FIG. 3 and a second surface S2 which is the back surface of the EL element 2. The through hole 4 is formed to be of a size and configuration such that a luminous efficiency sufficient for practical use is obtained, so that the uniform illumination to the entire surface of the LCD panel 1 is not prevented.

The EL element 2, which is a light emitting element performing surface emission, serves as a back light for illuminating the LCD panel 1 alone. Since any element that uniformly illuminates the entire surface can be used as the back light, for example, an arrangement may be used in which a plurality of light emitting elements such as light emitting diode (LED) chips are arranged and a diffusing plate is arranged on the light emitting sides of the chips. In that case, a through hole is formed at a position where no LED chips are arranged.

At a part of the EL element 2, a transparent electrode 6 is provided to be exposed out of the surfaces S1 and S2 through the through hole 4. The transparent electrode 6 comprises a film made of a transparent conductive material such as an indium tin oxide (ITO) film and a NESA film. In order that the transparent electrode 6 is not electrically in contact with the EL element 2, an insulating film (e.g. glass film) 8 is formed on the surface of the EL element 2.

Since the transparent electrode 6 is exposed out of the surfaces S1 and S2 through the through hole 4, the EL element 2 has a conductivity between the surfaces S1 and S2. Specifically, the EL element 2 receives a driving signal from the LSI chip 3 at the portion exposed out of the surface S2 and transmits the signal from the portion exposed out of the surface S1 to the LCD panel 1. In other words, the EL element 2 is provided with a function as an LSI chip mounting plate to electrically connect the LCD panel 1 and the LSI chip 3.

The LCD panel 1 is arranged on the surface S1 of the EL device 2. The LCD panel 1 is provided with a driving signal inputting transparent electrode 5 connected to the portion of the transparent electrode 6 exposed out of the surface S1 of the EL element 2. Like the transparent electrode 6, the transparent electrode 5 is made of a material such as the ITO film and the NESA film.

The back surface (e.g. polarizing plate, glass plate) of the LCD panel 1 on which the transparent electrode 5 is formed is insulating. The transparent electrode 5 is connected to a pixel electrode (not shown) provided in the LCD panel 1 through a side surface of the LCD panel 1 (or a through hole passing through a non-illustrated polarizing plate). When the back surface of the LCD panel 1 is conductive, a hyaline with which the transparent electrode 5 can be formed on the surface or a member made of an equivalent insulating material may be provided in advance.

The portion of the transparent electrode 6 exposed out of the surface S1 is formed so that its contact is opposite the transparent electrode 5. By performing positioning so that the transparent electrodes 5 and 6 are in contact at the contact and by screwing the LCD panel 1 and the EL element 2 at their ends, the electrical connection between the transparent electrodes 5 and 6 and the mechanical connection between the LCD panel 1 and the EL element 2 are made.

The LSI chip 3 is arranged on the surface S2 of the EL element 2, and constitutes a driving circuit for displaying an image on the LCD panel 1. The LSI chip 3 is provided with a driving signal outputting aluminum electrode 7 connected to the portion of the transparent electrode 6 exposed out of the surface S2 of the EL element 2. The surface of the LSI chip 3 is covered with an insulating film (e.g. silicon oxide film) 9 except the portion of the aluminum 7.

The portion of the transparent electrode 6 exposed out of the surface S2 is formed so that its contact is opposite the aluminum electrode 7. By performing positioning so that the transparent electrode 6 and the aluminum electrode 7 are in contact at the contact and by performing flip chip bonding, the electrical and mechanical connection (mounting) between the transparent electrode 6 and the aluminum electrode 7 is made.

By using a detachably attached sticky directional conductive member (e.g. zebra rubber) having a limited direction of conduction by arranging it so that its direction of conduction is toward the direction of connection between the electrodes 6 and 7 for the connection between the transparent electrode 6 and the aluminum electrode 7, the electrical and mechanical connection and disconnection of the LSI chip 3 to and from the EL element 2 can easily be made any number of times at need.

As described above, the contact between the transparent electrode 5 and the transparent electrode 6 and the contact between the transparent electrode 6 and the aluminum electrode 7 are opposite to each other. By forming the transparent electrodes 5 and 6 and the aluminum electrode 7 so that the contact between the transparent electrode 5 and the transparent electrode 6 and the contact between the transparent electrode 6 and the aluminum electrode 7 are opposite to each other on the same line, the formed electrode pattern can be simplified. The entire system including the LCD panel 1, the EL element 2 and the LSI chip 3 thus connected is used being packaged in a frame (not shown).

As described previously, in the conventional transmission-type LCDs (FIGS. 1 and 2) where the back surface of the LCD panel 1 is illuminated by a back light, if the LSI chip 3 is arranged on the back surface of the LCD panel 1 as shown in FIG. 2 to reduce the size of the LCD, the LSI chip 3 intercepts the light L to limit the back lighting function. In the embodiment of the present invention, however, since the LSI chip 3 is arranged on the surface S2, i.e. the EL element 2 is provided between the LCD panel 1 and the LSI chip 3, the light (in the direction of arrow mL) from the EL element 2 illuminating the LCD panel 1 is not intercepted by the LSI chip 3. Thus, since the back lighting function is not deteriorated, a clear display image is obtained. In addition, since the LSI chip 3 is arranged on the surface S2, the size of the entire LCD is reduced compared to the arrangement of FIG. 1 in which the LSI chip 3 is arranged on a side of the LCD panel 1.

According to the feature of the present invention, a driving signal output by the LSI chip 3 is transmitted from the aluminum electrode 7 connected to the transparent electrode 6 to the transparent electrode 5 through the portions of the transparent electrode 6 exposed out of the surfaces S1 and S2 through the through hole 4 of the EL element 2. The driving signal is input to the LCD panel 1. Thus, since the transparent electrode 6 passing through the through hole 4 performs the signal transmission between the LCD panel 1 and the LSI chip 3, the connecting member, the connector, the connection structure and the connecting process can be simplified, so that the arrangement of the entire LCD is simplified. This feature is favorable for the electrical connection of the LCD panel 1 and the mounting of the LSI chip 3.

While the LCD of the present invention may be used as a display for an LCD television receiver, the present invention is not limited there. The LCD of the present invention may be used in other outputters such as a printer head using an LCS (liquid crystal shutter) array and other semiconductor connectors. In the case of the printer head, a light beam from a fluorescent lamp is directed to an LCS panel and a light beam transmitted/intercepted by the ON/OFF of the shutter is formed into an image on the surface of a photoreceptor by a SELFOC lens array.

As described above, according to the present invention, the transparent electrode exposed out of the first and second surfaces through the through hole of the back light connects the driving signal inputting electrode and the driving signal outputting electrode of the output panel to transmit the driving signal from the driving circuit to the output panel, so that the simplification of the connecting member, the connector, the connection structure and the connecting process is achieved to realize an outputter of a simple structure.

In addition, since the light illuminating the output panel arranged on the first surface is not intercepted by the driving circuit arranged on the second surface, the back lighting function is not deteriorated. Further, since the driving circuit is arranged on the second surface, a compact outputter is realized compared to the conventional outputter in which the driving circuit is arranged on a side of the output panel.

Obviously, many modifications and variations of the present invention are possible in light of the above teachings. It is therefore to be understood that within the scope of the appended claims, the invention may be practiced other than as specifically described.

What is claimed is:

1. An outputter comprising:
   an output panel which outputs image information by transmission and interception of light, said output panel including a driving signal inputting electrode;

a back light means for illuminating the output panel, said back light means having a first surface which emits light and a second surface which is a back surface of the back light means, said back light means including a through hole extending between the first and second surfaces, and a transparent electrode formed on said first and second surfaces and extending through said through hole, said driving signal input electrode connected to a portion of the transparent electrode on said first surface such that the output panel is arranged on the first surface; and a driving circuit which outputs a driving signal to the output panel, said driving circuit arranged on the second surface of the back light means, said driving circuit including a driving outputting electrode connected to a portion of the transparent electrode formed on the second surface of said back light means.

2. An outputter according to claim 1, wherein said output panel is a liquid crystal display.

3. An outputter according to claim 1, wherein said driving circuit comprises an integrated circuit.

4. An outputter according to claim 1, wherein said back light comprises an electro luminescence element.

* * * * *